United States Patent [19]

Perry et al.

[11] Patent Number: 5,596,137
[45] Date of Patent: Jan. 21, 1997

[54] CAN VENT TESTING DEVICE

[75] Inventors: Michael R. Perry, Plymouth; James W. Finkowski, Andover; James A. Kivi, Brooklyn Center, all of Minn.

[73] Assignee: The Pillsbury Company, Minneapolis, Minn.

[21] Appl. No.: 502,433

[22] Filed: Jul. 14, 1995

Related U.S. Application Data

[63] Continuation of Ser. No. 118,058, Sep. 8, 1993, abandoned.

[51] Int. Cl.[6] .................................................. G01M 3/26
[52] U.S. Cl. .................................................... 73/49.2
[58] Field of Search ................................... 73/49.2, 45.2

[56] References Cited

U.S. PATENT DOCUMENTS

| | | | |
|---|---|---|---|
| 1,118,478 | 11/1914 | Dixon | 73/49.2 |
| 2,527,560 | 10/1950 | Maher | 73/49.2 |
| 2,645,117 | 7/1953 | Bendix et al. | 73/49.2 |
| 3,307,390 | 3/1967 | Behrens et al. | 73/45.2 |
| 3,418,845 | 12/1968 | Helms | 73/49.8 |
| 3,800,586 | 4/1974 | Delatorre et al. | 73/49.2 |
| 4,118,972 | 10/1978 | Goeppner et al. | 73/49.2 X |
| 4,194,388 | 3/1980 | Mack | 73/49.2 X |
| 4,523,452 | 6/1985 | Brayman | 73/49.2 |
| 4,683,745 | 8/1987 | Broughman, Jr. et al. | 73/49.2 |

FOREIGN PATENT DOCUMENTS

| | | | |
|---|---|---|---|
| 35335 | 2/1983 | Japan . | |
| 44325 | 3/1983 | Japan . | |
| 73135 | 4/1987 | Japan | 73/49.2 |

*Primary Examiner*—Hezron E. Williams
*Assistant Examiner*—Daniel S. Larkin
*Attorney, Agent, or Firm*—Janal M. Kalis; Aleya Rahman

[57] ABSTRACT

The present invention includes a device and a method for testing a can for leakage with the device including a main body, a mechanism for sealing against an internal surface of the can to effect a sealed chamber within the can, a mechanism for placing the mechanism for sealing in a sealing relationship with the internal surface of the can to effect the sealed chamber, and a mechanism for effecting an increase of pressure in the sealed chamber for determining leakage from the sealed chamber.

20 Claims, 11 Drawing Sheets

CAN VENT TESTING DEVICE

This is a continuation of prior application Ser. No. 08/118,058, filed Sep. 8, 1993, now abandoned.

BACKGROUND OF THE INVENTION

The present invention relates to a device and method for testing a can for leakage and to a system for testing cans for leakage.

Placement of food products into containers during commercial packaging operations poses challenging quality control problems. One such problem arises where the semi-fluid nature of a product causes entrapment of air with the product during packaging. For example, placement of dough in spiral-wound composite containers typically traps air between the product and a closed end of the containers.

It is desirable to remove entrapped air from food containers since entrapped air may cause undesirable characteristics in the food product. As one example, food which is left in contact with entrapped air for excessive periods of time becomes discolored and eventually spoils. A discolored food product is unacceptable to an end user since it is not what the user expected and is unappetizing.

Containers in which semi-fluid food products are packaged may include a vent feature for venting entrapped air following packaging of the food product. For instance, spiral-wound composite containers in which dough products are packaged may include a vent structure at an end of the composite containers. As one example, a metal end of some composite containers is crimped onto an end of a composite wall of the containers such that entrapped air escapes through the crimped joint when elevated pressures exist in the containers.

Elevated pressure sufficient to vent entrapped air through the crimped joint develops for various reasons. Many products, including dough, expand when subject to increased temperatures, thereby pressurizing the container to some extent. Increased pressures also arise due to chemical reactions involving products packaged within containers. Taking dough as an example, leavening agents contained in dough will react to raise pressure in containers when suitable conditions exist.

It is desirable for a commercial packager to have a method and apparatus for testing a suitable number of containers to determine whether the container vent feature is performing satisfactorily. One such apparatus includes a cylindrical test head with one or more seal rings disposed about the periphery of the test head. The test head includes a threaded bore for introducing a pressurized fluid, such as air, for testing the vent feature.

Testing of a container using this apparatus includes placing the open end of the container over the test head such that the test head receives the container. Next, the cylindrical wall of the open end of the container is advanced past the seal ring(s) to seal the container for testing. After the can is positioned on the test head, with the seal ring(s) sealing against the internal cylindrical wall of the container, a positioning bar may be placed over the test head and against the closed end of the container to secure the container on the test head.

A pressurized fluid such as air is introduced through the bore of the test head and into the sealed chamber of the container. The term "sealed chamber", for purposes of this disclosure, means the volume of the tested container which is sealed and enclosed by the test apparatus. After shutting off the flow of pressurized fluid into the sealed chamber, the drop in pressure within the sealed chamber due to leakage from the container is measured over a set time period. The rate of leakage from the sealed chamber is calculated using an equation which includes appropriate pressure drop variables.

Determining leakage rates using this apparatus and method has been found to be unsatisfactory for several reasons. For example, practitioners have discovered that it is necessary to place tape around the container wall proximate the open end of the spiral-wound container. The tape allows the spiral-wound joint of the container to withstand the forces the seal ring(s) exert on the spiral wound joint as the open end and internal wall of the container is forced over and by the seal ring(s). Without the taping, the spiral-wound joint sometimes fractures and the container sometimes splits open due to passage over the seal ring(s), rendering the test futile. Practitioners have also discovered that silicone grease typically must be applied to the spiral-wound joint to reduce friction and assure sealing between the spiral wound joint and the test apparatus as the container is placed onto the test apparatus.

Additionally, forces exerted on the closed end of the container to force the open end of the container by the seal ring(s) may damage the crimped joint of the closed end of the container. Damaged crimped joints may change the leakage characteristics of containers such that leakage rates determined during testing are invalid and misleading.

Another problem arises because the seal created by the seal ring(s) is created as the container is placed onto the test head. If the test apparatus is not vented to atmosphere as the container is forced over the seal ring(s), pressure builds inside the container as the open end of the can advances beyond the seal ring(s). The raised pressure increases the force required to position the container on the test apparatus.

The raised pressure aggravates the force-induced damage to the crimped joint at the closed end of container. The increased pressure may also inadvertently expose the container to a greater pressure than the desired test pressure, thereby damaging the spiral-wound joint and the crimped joint. The damaged joints may cause the container to burst during testing, rendering the test useless. Also, the spiral-wound joint may leak and the crimped joint may have different leakage characteristics, rendering any leak test results invalid.

A further problem is that the described test apparatus and method is highly dependent upon the volume of the system, including the volume of the test apparatus and of the sealed chamber of the container tested. The equation used to calculate the rate of leakage from the container depends upon several variables including the change in pressure in the container during testing, the amount of time during which the pressure change occurred, and the combined volume of the test apparatus and the sealed chamber.

Testing using the described test apparatus is also problematic because of difficulties encountered in controlling and determining the volume of the sealed chamber and the volume of the test apparatus. The volume of the sealed chamber depends upon several variables including the location of the seal rings on the test head, the length and diameter of the container tested, and container dimension changes created in the wall of the container by forcing the container past the seal ring(s). The test apparatus volume includes that volume located between the test apparatus air shut-off valve and the point where the sealed chamber and the bore for introducing pressurized fluid meet.

As noted, measurement of several variables including the following is required before the leakage rate is calculated:

1. Initial test pressure.
2. Final test pressure.
3. Time between measurement of initial and final test pressure.
4. Sealed chamber volume.
5. Test apparatus volume.

Measurement of multiple variables such as these requires excessive time and introduces sources of error. Therefore, it is desirable when testing a container for leakage to reduce the number of variables which must be controlled or determined.

Additionally, the described test apparatus and method are only usable for testing containers within a very narrow range of internal diameters. Factors including the dimensions of the test head and the thickness of the seal ring(s) affect the narrow range. To test containers with diameters outside the narrow range, seal ring(s) with a different thickness and/or a testing apparatus with different dimensions are required. Thus, the described test apparatus and method are not flexible enough to quickly test different containers with more than nominally different internal diameters.

SUMMARY OF THE INVENTION

The present invention includes a device for testing a can for leakage with the device including a main body, a mechanism for sealing against an internal surface of the can to effect a sealed chamber within the can, and a mechanism for placing the mechanism for sealing in a sealing relationship with the internal surface of the can to effect the sealed chamber. The device of the present invention further includes a mechanism for effecting an increase of pressure in the sealed chamber for determining leakage from the sealed chamber. The present invention also includes a method for testing a can for leakage and a system for testing cans for leakage.

In one embodiment, the mechanism for sealing against an internal surface of the can to effect a sealed chamber within the can includes a seal ring mounted on the main body, and the mechanism for placing the mechanism for sealing in a sealing relationship with the internal surface of the can to effect the sealed chamber includes a mechanism for moving the seal ring into a sealing relationship with an interior surface of the can to effect a sealed chamber between the can and the main body.

DETAILED DESCRIPTION OF THE PREFERRED EMBODIMENTS

Figure 1:
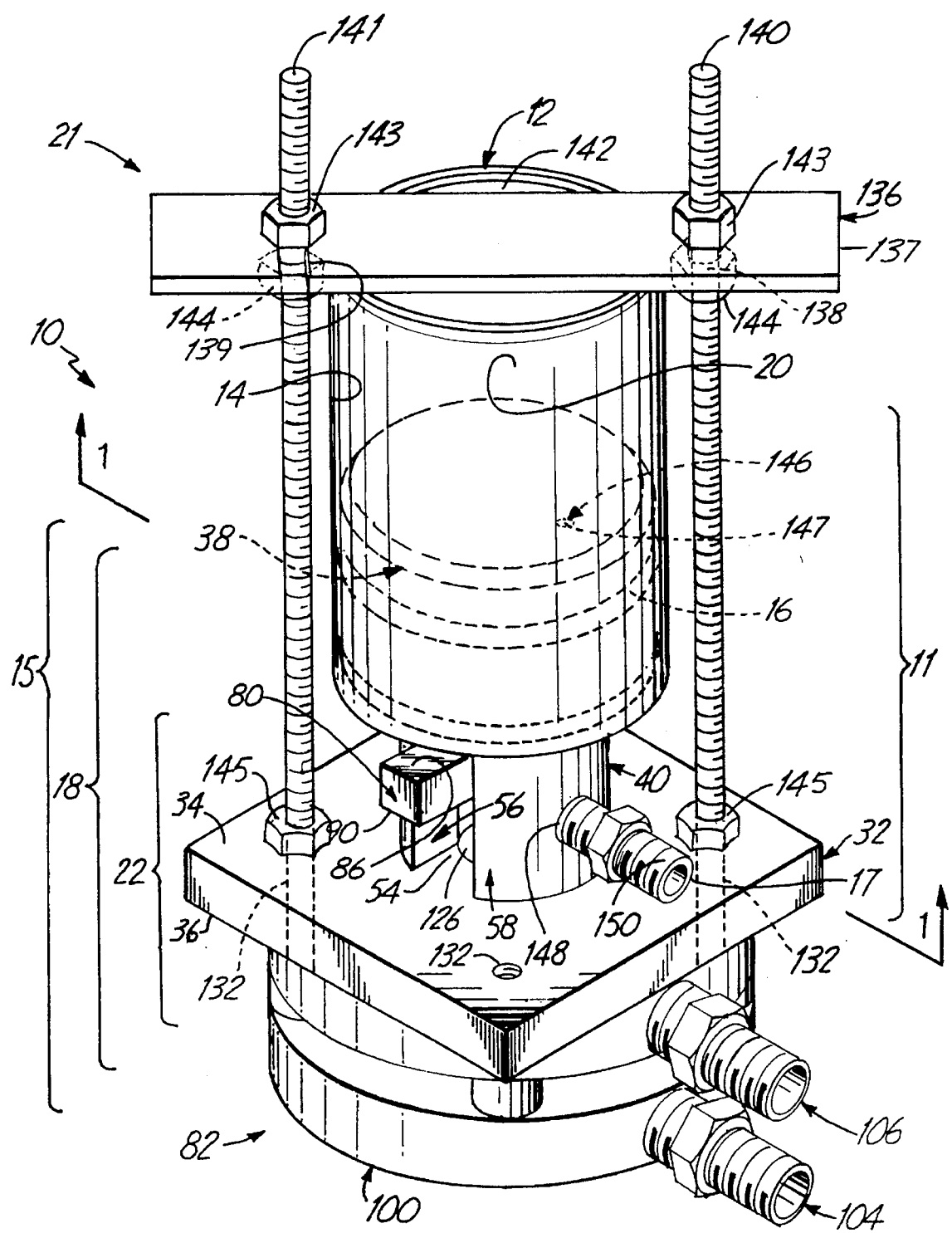
FIG. 1 is a perspective view of one embodiment of the improved can testing device of the present invention.
Figure 3:
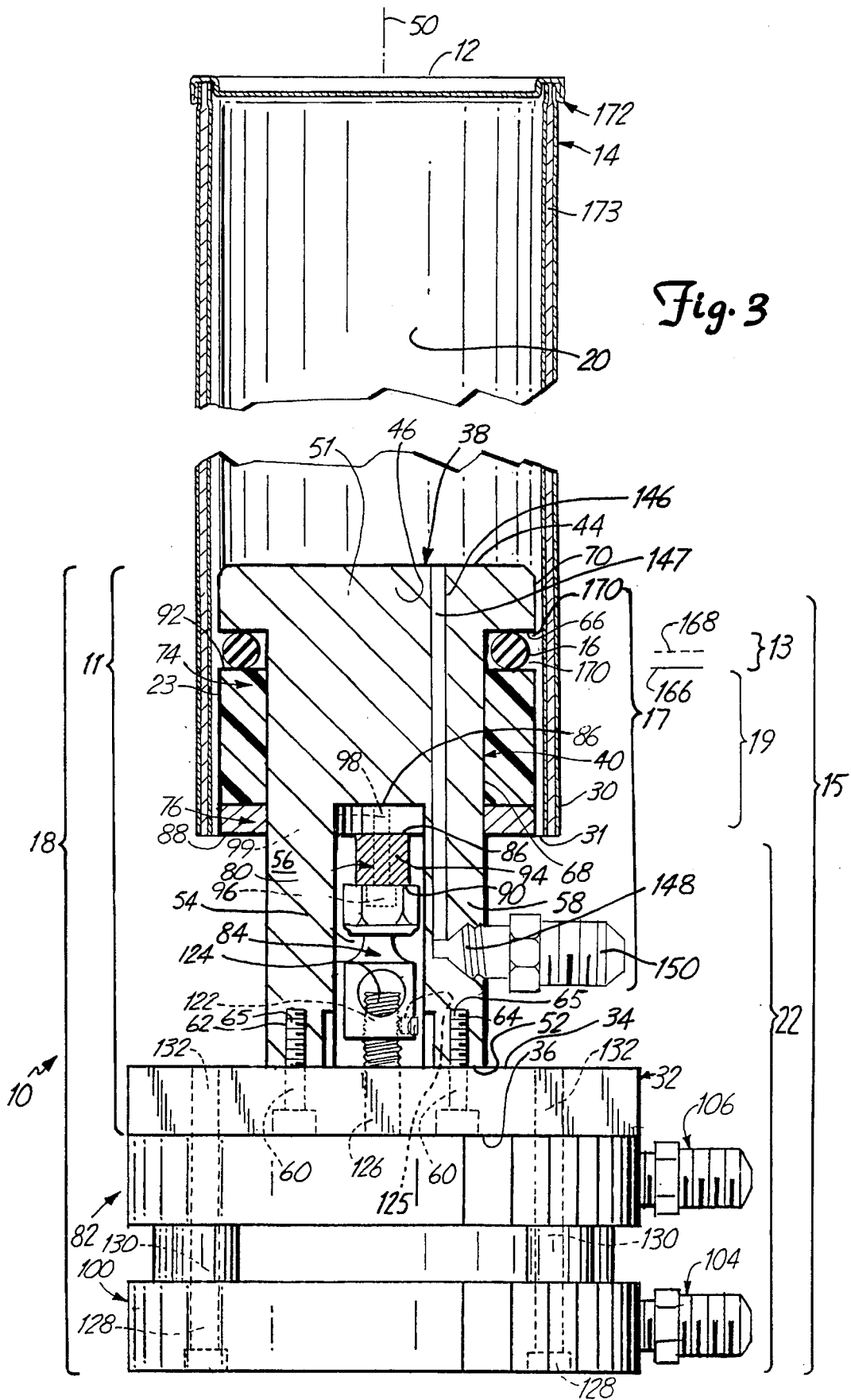
FIG. 3 is a sectional view taken along line 1—1 of FIG. 1.

A can testing device of the present invention, illustrated generally at 10 in FIG. 1, includes a main body 11 for receiving a can 12; a mechanism 13, shown in FIG. 3, for sealing against an interior surface 14 of the can 12 to effect a sealed chamber 20 between the can 12 and the main body 11; a mechanism 15 for placing the mechanism 13 for sealing in a sealing relationship with the interior surface 14 of the can 12 to effect the sealed chamber 20 between the can 12 and the main body 11; and a mechanism 17 for effecting an increase of pressure in the sealed chamber 20 for determining leakage from the sealed chamber 20. The present invention additionally includes a method for testing the can 12 for leakage.

Throughout the drawings, like elements will be referred to with like reference characters.

In the embodiment illustrated in FIG. 1, the mechanism 13 for sealing against an interior surface 14 of the can 12 to effect a sealed chamber 20 includes a seal ring 16 mounted on the main body 11. Additional embodiments of the mechanism 13 for sealing against an interior surface 14, including inflatable bladders and other extensible mechanisms, are contemplated for the present invention. The mechanism 15 for placing the mechanism 13 for sealing in a sealing relationship with the interior surface 14 of the can 12 to effect the sealed chamber 20 includes a mechanism 18 for moving the seal ring 16 into a sealing relationship with an interior surface 14 of the can 12 to effect the sealed chamber 20 between the can 12 and the main body 11. Additional embodiments of the mechanism 15 for placing the mechanism 13 for sealing in a sealing relationship with the interior surface 14 of the can 12 to effect the sealed chamber 20, including inflation devices and other devices for placing extensible mechanisms, are contemplated for the present invention. Additionally, in the embodiment of FIG. 1, the can testing device 10 includes a mechanism 21 for positioning and securing the can 12.

Figure 8:
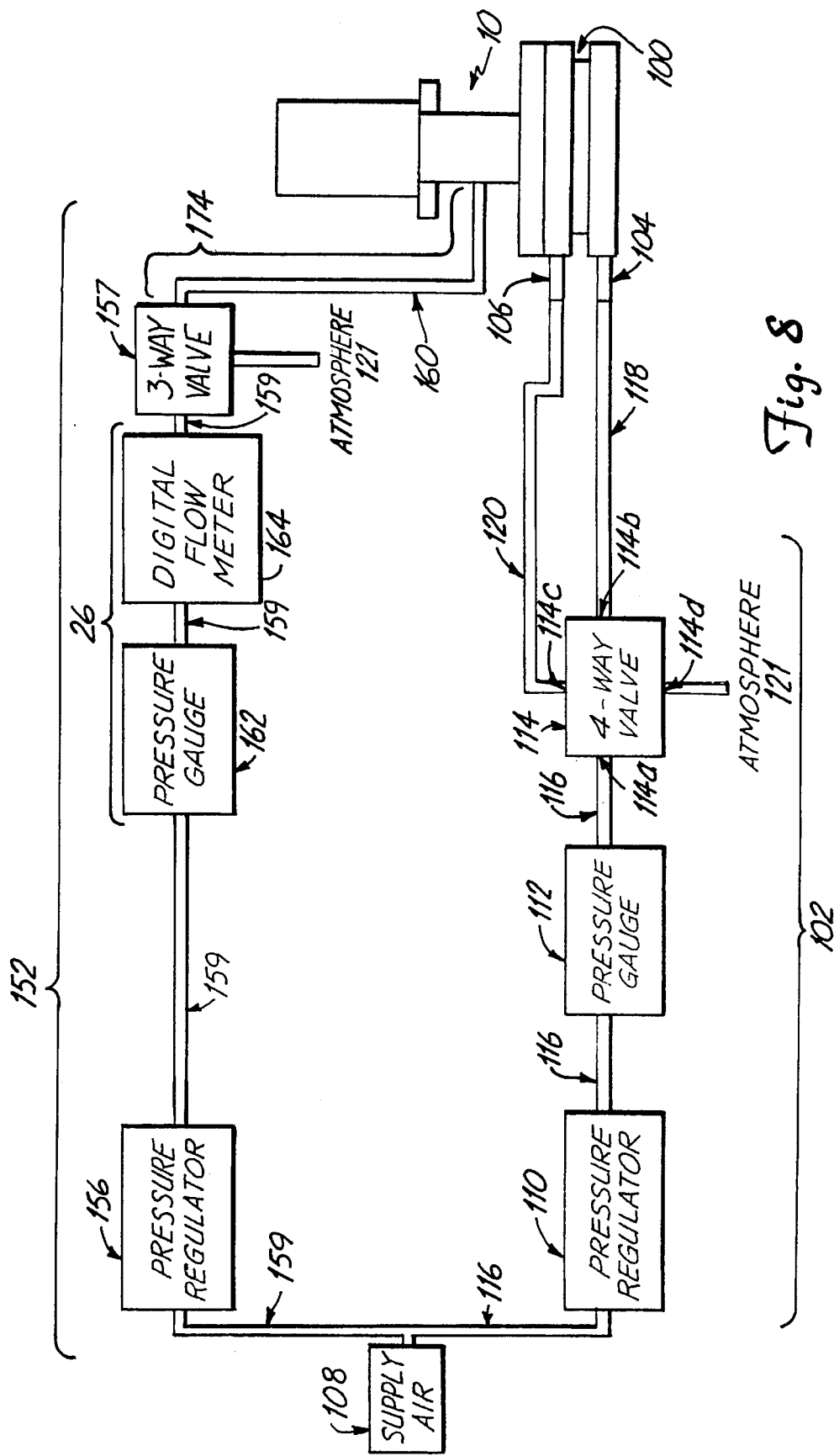
FIG. 8 is a schematic view of seal actuation components in one embodiment of the improved can testing device.

As illustrated in FIG. 3, the mechanism 18 for moving the seal ring 16 into a sealing relationship with the interior surface 14 of the can 12 includes a sleeve member 19 mounted on the main body 11 for forcing the seal ring 16 against the interior surface 14 of the can 12 and a mechanism 22 for moving the sleeve member 19 into operating relationship with the seal ring 16. Additionally, as depicted in FIG. 8, the can testing device 10 includes a mechanism 26 for measuring leakage from the can 12.

The can testing device 10 of the present invention does not force the seal ring 16 against the interior surface 14 of the can 12 until after the can 12 is positioned on the can testing device 10. Complete placement of the can 12 prior to sealing by the seal ring 16 is beneficial for a number of reasons. For example, the can 12 is positioned on the can testing device 10 without using force to push the can 12 by the seal ring 16. Additionally, reinforcement of container joints (not shown) with tape is not necessary before positioning the can 12 on the testing device 10. In the case of a spiral-wound dough can, referring back to FIG. 3, taping of a lower edge 30 of an open end 31 of the can 12 is unnecessary to reinforce a spiral joint (not shown) of the can 12.

The can testing device 10 and method of the present invention also eliminate the dependence of the leakage rate determination on the sealed chamber and testing device volumes, as later explained. Additionally, with the device 10 and apparatus of the present invention, the can 12 is more quickly positioned and tested and the leakage rate is more quickly and directly determined than with existing apparatuses and methods.

The main body 11 of the embodiment illustrated in FIG. 3 includes a base 32, a cap 38, and a sleeve-receiving member 40 which is located between the base 32 and the cap 38. The cap 38 takes the form of a circular plate in FIG. 1, although other shapes are contemplated for the cap 38. The cap 38 includes a top side 44 and a bottom side 46. The top side 44 of the cap 38 faces away from the base 32.

The sleeve-receiving member 40 is cylindrically-shaped in this embodiment, although other shapes are contemplated. The sleeve-receiving member 40 includes a top end 51 and a bottom end 52 and also includes a rectangular chamber 54. The base 32, which takes the form of a rectangular plate in FIG. 3, includes a top side 34 and a bottom side 36. The base 32, the cap 38 and the sleeve-receiving member 40 of the main body 11 are preferably made of aluminum.

In the embodiment of FIG. 3, the cap 38 and the sleeve-receiving member 40 of the main body 11 are integral with each other at the bottom side 46 of the cap 38 and at the top end 51 of the sleeve-receiving member 40. Additionally, the top side 34 of the base 32 is fixedly attached to the bottom end 52 of the sleeve-receiving member 40. The cap 38, the sleeve-receiving member 40, the rectangular chamber 54, and the base 32 are centered about a longitudinal axis 50 of the sleeve-receiving member 40, as later described.

The rectangular chamber 54 extends from the bottom end 52 of the sleeve-receiving member 40 along the axis 50 toward the top end 51 of the sleeve-receiving member 40. The rectangular chamber 54 extends sufficiently far toward the top end 51 to allow the sleeve member 19 and the mechanism 22 for moving the sleeve member 19 to fully cooperate in forcing the seal ring 16 against the interior surface 14. In the embodiment of FIG. 3, the rectangular chamber 54 extends from the bottom end 52 of the sleeve-receiving member 40 approximately half the distance toward the top end 51 of the sleeve-receiving member 40.

The rectangular chamber 54 separates and defines opposing left and right leg portions 56, 58 of the sleeve-receiving member 40. The left leg portion 56, the right leg portion 58, and the rectangular chamber 54 are of approximately equal thickness and extend a substantially equal distance along the axis 50, starting at the bottom end 52 of the sleeve-receiving member 40.

The base 32 further includes clearance holes 60 which extend from the top side 34 to the bottom side 36 of the base 32. The left and right leg portions 56, 58 of the sleeve-receiving member 40 include threaded bores 62 and 64, respectively, which are in alignment with the clearance holes 60. The main body 11 includes screws 65 which extend through the clearance holes 60, starting at the bottom side 36 of the base 32, and terminate in the threaded bores 62 and 64, respectively. The screws 65 fix the left and right leg portions 56, 58 to the top side 34 of the base 32, thereby fixing the sleeve-receiving member 40 to the base 32.

The cap 38 includes an inverted radial ledge 66 which faces the top side 34 of the base 32. The inverted radial ledge 66 extends from an outer peripheral surface 68 of the sleeve-receiving member 40 to an outer peripheral surface 70 of the cap 38. The width of the radial ledge 66 equals one half the diameter of the cap 38 minus one half the diameter of the sleeve-receiving member 40. The outer peripheral surface 68 of the sleeve-receiving member 40 and the outer peripheral surface 70 of the cap 38 are substantially concentric to each other and are substantially perpendicular to the top side 34 of the base 32.

The seal ring 16 is loosely positioned around the outer peripheral surface 68 of the sleeve-receiving member 40 proximate the radial ledge 66. The seal ring preferably has a relaxed cross-sectional diameter which is equal to or less than the width of the radial ledge 66. In one embodiment, the seal ring 16 is an O-ring made of a silicone-based elastomer with a 40 durometer rating. In another embodiment, the seal ring 16 is an O-ring made of a nitryl rubber elastomer such as Buna-N®. O-rings made of suitable materials, preferably including silicone-based elastomers and nitryl rubber elastomers, are available from Precision Associates, Inc. of Minneapolis, Minn.

The sleeve member 19, in the embodiment of FIG. 3, includes an upper sleeve portion 74 and a lower sleeve portion 76. The upper and lower sleeve portions 74, 76 slidably engage the outer peripheral surface 68 of the sleeve-receiving member 40 such that the upper sleeve portion 74 confronts the seal ring 16. The outer diameters of the upper and lower sleeve portions 74, 76 preferably are substantially equal to the diameter of the cap 38. The upper and lower sleeve portions 74, 76 adjoin each other and are connected by screws 96, as described later. The upper sleeve portion 74 is preferably made of a molding plastic, such as Delrin®, and the lower sleeve portion 76 is preferably made of aluminum. Delrin® is available from E. I. duPont de Nemours & Company of Wilmington, Del.

Figure 5:
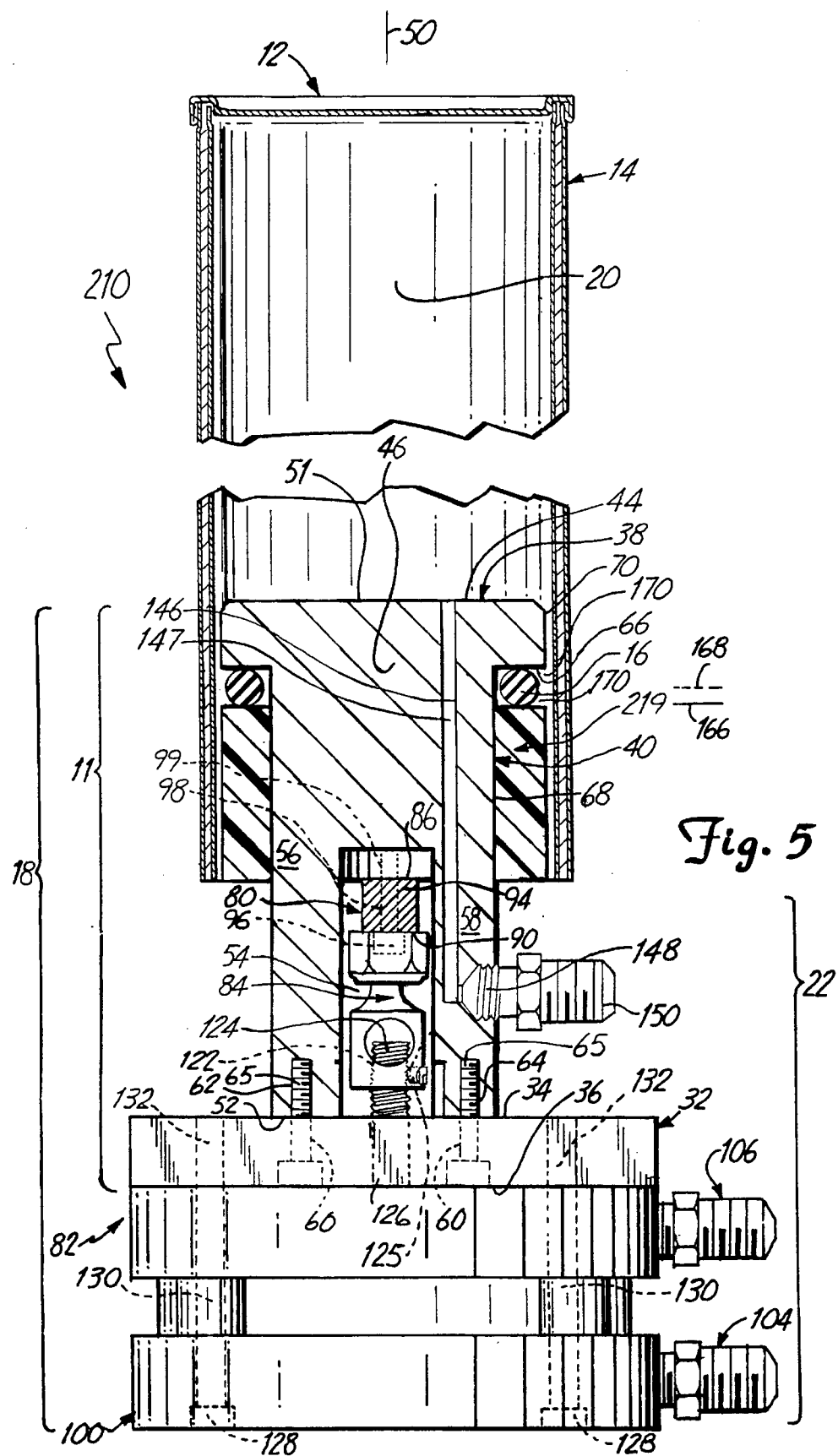
FIG. 5 is a sectional view of another embodiment of the improved can testing device.

In another embodiment of the present invention, as illustrated in FIG. 5, a can testing device 210 includes a single piece sleeve member 219, rather than the sleeve member 19 illustrated in FIG. 3. The sleeve member 219 slidably engages the outer peripheral surface 68 of the sleeve-receiving member 40 such that the sleeve member 219 confronts the seal ring 16. The outer diameter of the sleeve member 219 is preferably substantially equal to the diameter of the cap 38. The sleeve member 219 is preferably made of aluminum.

Referring back to the embodiment illustrated in FIG. 3, the sleeve member 19 includes a driver end 88 and a ring end 92. The driver end 88 and the ring end 92 are on opposing ends of the sleeve member 19. The ring end 92 of the sleeve member 19 engages the seal ring 16.

The mechanism 22 for moving the sleeve member into operating relationship with the seal ring 16 of the described embodiments, as illustrated in FIG. 3, includes a drive block 80 which engages the sleeve member 19, a driver 82 for moving the drive block 80, and a swiveling connector 84 which links the driver 82 to the drive block 80. The drive block 80 includes a top major surface 86. The top major surface 86 engages the driver end 88 of the sleeve member 19.

Though the drive block 80 is not necessarily fixed to the sleeve member, the drive block 80 of the embodiment illustrated in FIG. 5 is fixedly attached to the sleeve member 219 by a pair of screws 96. In the embodiment of FIG. 5, the drive block 80 includes a pair of smooth, clearance holes 98.

Also, the sleeve member 219 includes a pair of threaded bores 99. Each threaded bore 99 is in alignment with one of the clearance holes 98, respectively. Each screw 96 extends through one of the clearance holes 98 and into the respective threaded bore 99. In the embodiment illustrated in FIG. 3, the threaded bores 99 and screws 96 extend into (not shown) the upper sleeve portion 74 of the sleeve member 19, thereby securing the lower sleeve portion 76 to the upper sleeve portion 74.

Top and bottom major surfaces 86, 90 of the drive block 80 are substantially rectangular in shape. A cross section 94 of the block 80, taken through surfaces 86, 90, as illustrated in FIG. 3, is substantially square in shape. The length of the drive block 80 equals or exceeds the outer diameter of the sleeve member 19. The drive block 80 is substantially centered about the axis 50 within the rectangular chamber 54. The drive block 80 is preferably made of steel.

The driver 82 of the illustrated embodiments includes a drive cylinder 100, as illustrated in FIG. 3, actuated by a drive air circuit 102, as illustrated in FIG. 8. Other embodiments of the driver 82, including hydraulic and magnetic mechanisms, are contemplated for the present invention. The drive cylinder 100 includes an actuation air port 104 and a deactuation air port 106. The air circuit 102 includes a supply air source 108 oriented such that drive air flows via supply air tubing 116 through a seal pressure regulator 110, a pressure gauge 112, and then a four-way valve 114. The drive cylinder 100 is preferably a Bimba Model FO double acting flat cylinder with ½ inch travel. The pressure regulator 110 is preferably a Linde Model 1-SG4820-100 pressure regulator available from Union Carbide Corporation (Linde Division) of Somerset, N.J. The four-way valve 114 is preferably a Whitey Co. Model B-43YF2 four-way valve, which is available from Minnesota Valve & Fitting Co. of Eden Prairie, Minn.

Figure 9:
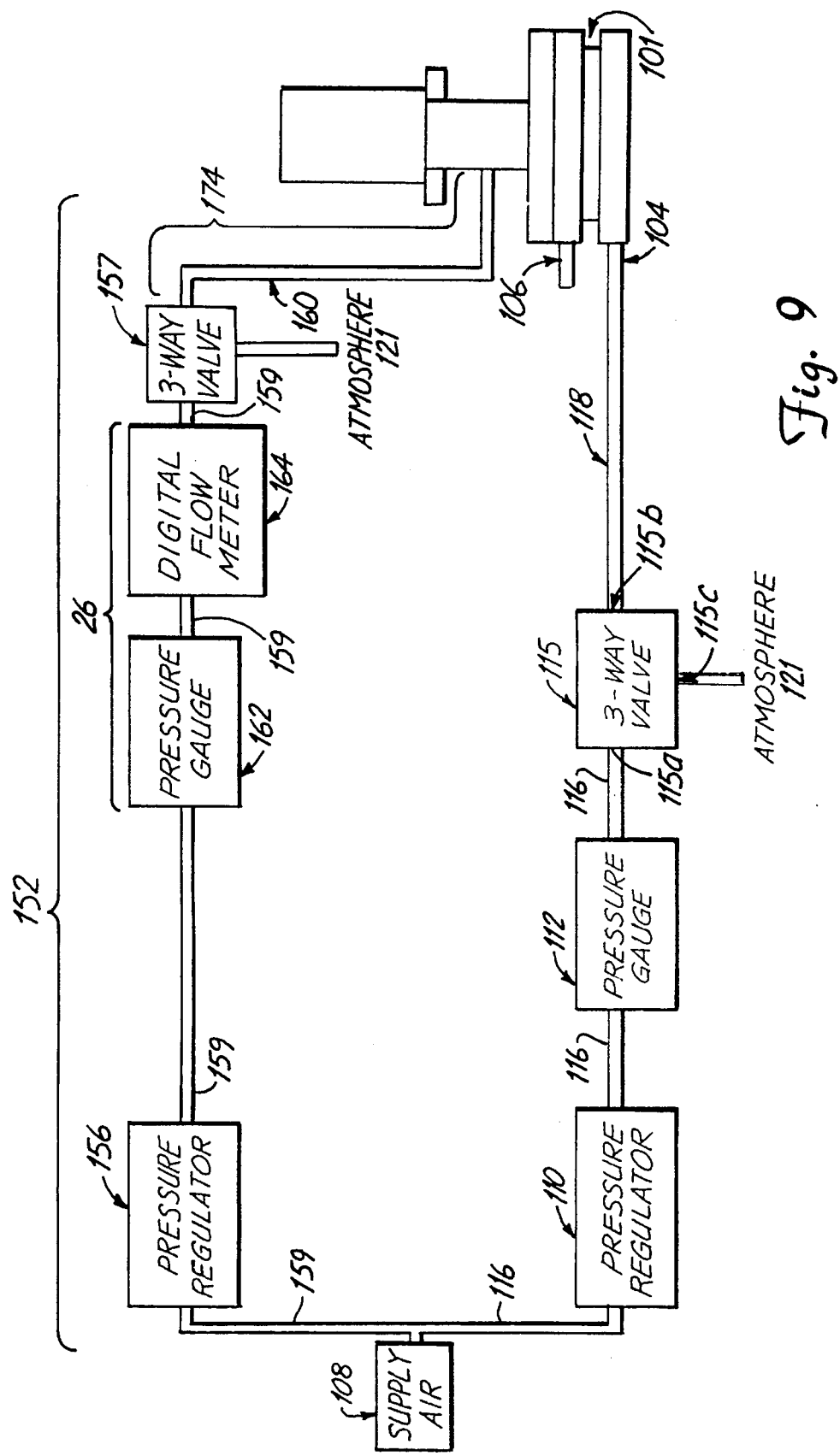
FIG. 9 is a schematic view of seal actuation components in another embodiment of the improved can testing device.

In another embodiment illustrated in FIG. 9, a drive cylinder 101 is substituted for the drive cylinder 100. The drive cylinder 101 is preferably a Bimba Model FOS spring return flat cylinder with ½ inch travel. The drive cylinder 101 includes the deactuation air port 106, but the port 106 serves as a vent to atmosphere 121. Additionally, in the embodiment of FIG. 9, a three-way valve 115 is used in place of the four-way valve 114. Bimba Model FO and Model FOS flat cylinders are each available from Bimba Manufacturing Company of Monee, Ill. The three-way valve 115 is preferably a Whitey Co. Model B-43XS4 three-way valve, which is available from Minnesota Valve & Fitting Co. of Minneapolis.

The four-way valve 114 of FIG. 8 includes a supply air port 114a, an actuation port 114b, a deactuation port 114c and a vent port 114d. The cylinder 100 drives the sleeve member 19 toward the cap 38, referring to FIG. 3 for illustration, when the valve 114, referring back to FIG. 8, is positioned to direct pressurized air flow from the supply air source 108 into the supply air port 114a via the supply air tubing 116, then out the actuation port 114b and into the actuation port 104 of the cylinder 100 via the actuation tubing 118. Continuing, pressurized air flows from the deactuation port 106 of the cylinder 100 into the deactuation port 114c via the deactuation tubing 120 and is then directed by the valve 114 through the vent port 114d to atmosphere 121.

The cylinder 100 pulls the sleeve member 19 away from the cap 38, referring to FIG. 3 for illustration, when the valve 114, referring back to FIG. 8, is positioned to direct pressurized air flow from the supply air source 108 into the supply air port 114a via the supply air tubing 116, then out the deactuation port 114c and into the deactuation port 106 of the cylinder 100 via the deactuation tubing 120. Continuing, pressurized air flows from the actuation port 104 of the cylinder 100 into the actuation port 114b via the actuation tubing 118 and is then directed by the valve 114 through the vent port 114d to atmosphere 121.

In the embodiment of FIG. 9, the three-way valve 115 includes a supply air port 115a, an actuation port 115b, and a vent port 115c. The cylinder 101 drives the sleeve member 19 toward the cap 38, referring to FIG. 3 for illustration, when the valve 115, referring back to FIG. 9, is positioned to direct pressurized air flow from the supply air source 108 into the supply air port 115a via the supply air tubing 116, then out the actuation port 115b and into the actuation port 104 of the cylinder 100 via the actuation tubing 118. Continuing, pressurized air vents directly to atmosphere 121 through the deactuation port 106 of the cylinder 100.

The cylinder 101 pulls the sleeve member 19 away from the cap 38, referring to FIG. 3 for illustration, when the valve 115, referring back to FIG. 9, is positioned to stop pressurized air flow from the supply air source 108 at the supply air port 115a. Pressurized air flows from the cylinder through actuation port 115b, then to atmosphere 121 via the vent port 115c. With the valve 115 in this position, the cylinder 100 is vented to atmosphere 121 via the deactuation port 106 and the actuation port 104 and the spring return mechanism (not shown) of the cylinder 101 drives the sleeve member 19 away from the cap 38, referring to FIG. 3. Where the double acting cylinder is used, the compressed o-ring forces sleeve 19 away from the cap 38.

In FIG. 3, the swiveling connector 84 of the mechanism 22 for moving the sleeve member 19 into operating relationship with the seal ring 16 includes a threaded bore 122. The drive cylinder 100 includes a threaded shaft 124 which is fixedly attached to the drive cylinder 100. The threaded shaft 124 is received in the threaded bore 122 and is locked in position within the threaded bore 122 by a threaded set pin 125. The position and travel of the sleeve member 19 relative to the main body 11 is adjustable by varying the depth to which the shaft 124 is threaded into the bore 122 and by varying the stroke length of the drive cylinder 100.

The base 32 includes a bore 126 which extends from the top side 34 to the bottom side 36 of the base 32. The bore 126 is substantially centered about the axis 50. The threaded shaft 124 extends through the bore 126 such that the swiveling connector 84 is located proximate the top side 34 of the base 32 and the drive cylinder 100 is located proximate the bottom side 36 of the base 32.

The drive cylinder 100 includes attachment bores 130 for attaching the drive cylinder 100 to the base 32. The base 32 includes threaded bores 132 which are in alignment with the attachment bores 130. The drive cylinder 100 is attached to the bottom side 36 of the base 32 by screws 128. The screws 128 extend through the attachment bores 130 into the threaded bores 132.

The mechanism 21 for positioning and securing the can 12, as illustrated in FIG. 1, includes a positioning bar 136 to orient and secure the can 12 on the device 10. The positioning bar 136 includes a smooth bore 138 and a slot 139. The mechanism 21 also includes a threaded right shaft 140 which extends through the bore 138, a threaded left shaft 141 which extends through the slot 139, and nuts 143, 144 which are threaded onto the shafts 140, 141 above and below, respectively, the positioning bar 136.

The shafts 140, 141 are threaded into the bores 132 of the base 32, starting from the top side 34 of the base 32, such that the shafts 140, 141 extend along the main body 11, substantially parallel to the outer peripheral surfaces 68, 70 of the sleeve-receiving member 40 and the cap 38, respectively. Nuts 145 are threaded onto the shafts 140, 141 and against the top side 34 of the base 32 to hold the shafts 140, 141 in position through the bores 132. With the can 12 oriented for testing on the device 10, the positioning bar 136 is located between and in contact with the nuts 143, 144 and above and in contact with a closed end 142 of the can 12. The positioning bar 136 is preferably made of steel.

Figure 2:
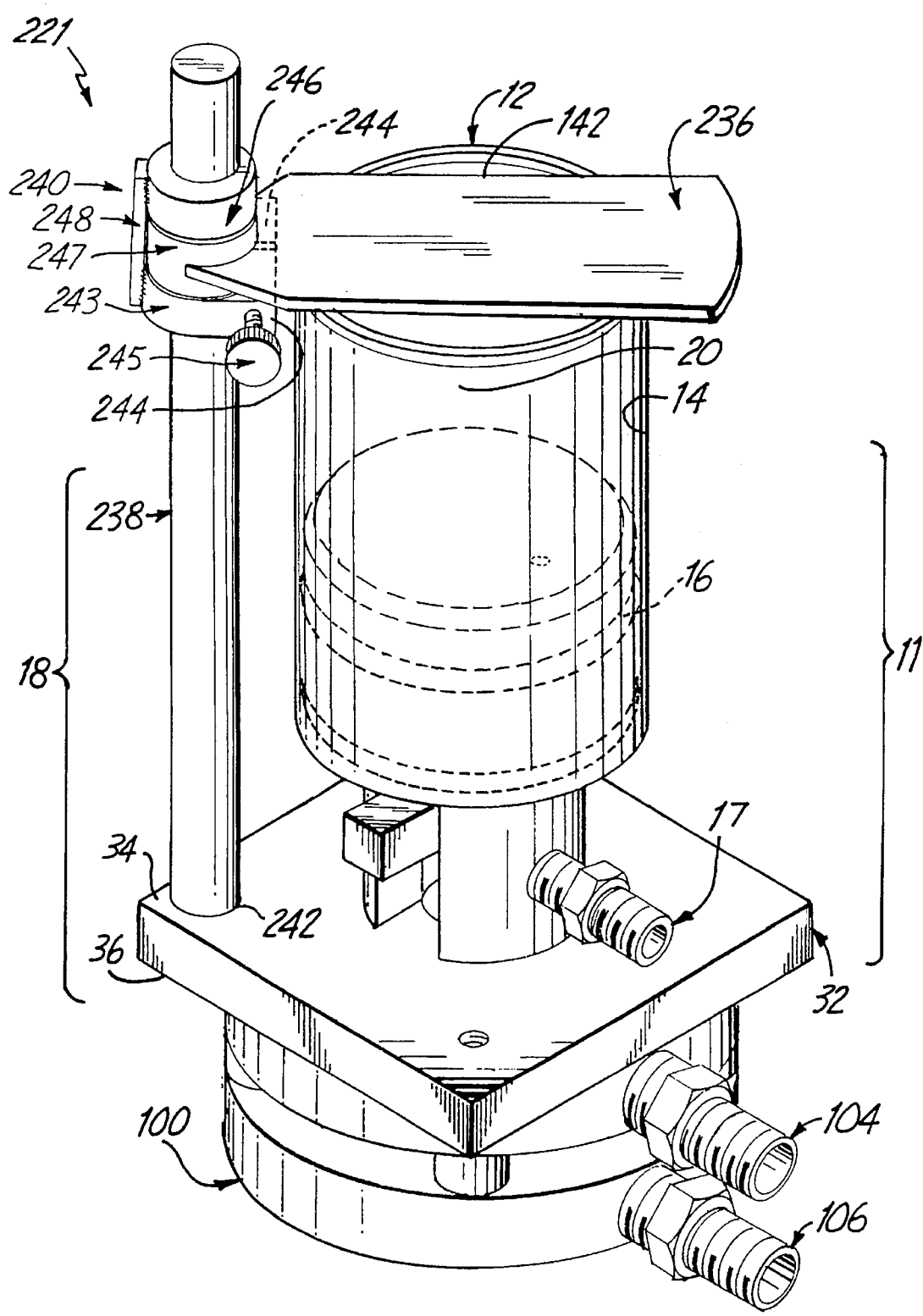
FIG. 2 is a perspective view of another embodiment of the improved can testing device of the present invention.

In another embodiment of the present invention, a mechanism 221 for positioning and securing the can 12, as illustrated in FIG. 2, includes a positioning bar 236, a support post 238, and a clamping assembly 240 which connects the positioning bar 236 to the support post 238. The support post 238 preferably takes the form of a cylindrical steel rod. A lower end 242 of the support post 238 is fixedly attached to the top side 34 of the base 32.

The clamping assembly 240 includes a split ring 243 which slidably engages the post 238. The split ring 243 includes arms 244 and a clamping screw 245 which connects the arms 244. The clamping assembly 240 additionally includes rings 246, 247 which slidably engage the post 238. The clamping assembly 240 includes a connecting bar 248 which is fixedly connected to an outer surface (not shown) of the rings 243, 246 such that the ring 247 loosely engages and is confined between the rings 243, 246.

The ring 247 is selectively rotatable, by hand in one preferred embodiment, about the post 238. The positioning bar 236 is fixedly attached to the ring 247. Loosening the clamping screw 245 spreads the arms 244 out of clamping relationship with the support post 238, permitting sliding movement of the rings 243, 246 along the post 238 for selective vertical placement of the ring 247 and the positioning bar 236. The positioning bar 236, the post 238, the rings 243, 246, 247, and the connecting bar 248 are made of metal, preferably steel. The connecting bar 248 is fixedly attached to the rings 243, 246 by conventional means such as welding, preferably.

The mechanism 17 for effecting an increase of pressure in the sealed chamber 20 of the can 12, as illustrated in FIG. 3, includes a test air bore 146 in the main body 11. The test air bore 146 includes a substantially vertical component 147 and a substantially horizontal component 148. Additionally, the mechanism 17 includes a test air connector 150 connected to the horizontal component 148 and a test air supply circuit 152, as depicted in FIG. 8, for supplying air through the test air bore 146 to the sealed chamber 20 of the can 12.

The vertical component 147 of the test air bore 146, as illustrated in FIG. 3, begins at the top side 44 of the cap 38 and extends toward the base 32 to a point (not shown) in the right leg portion 58 above the threaded bore 64 and below a lowest operating position (not shown) of the driver end 88 of the sleeve member 19. The vertical component 147 is substantially parallel to the outer peripheral surface 68 of the sleeve-receiving member 40 and is threaded proximate the top side 44 of the cap 38. The horizontal component 148 of the test air bore 146 is located in the right leg portion 58 and extends outward from the vertical component 147, proximate the rectangular chamber 54, through the outer peripheral surface 68 of the sleeve-receiving member 40.

The test air supply circuit 152, as illustrated in FIG. 8, includes the supply air source 108, a test pressure regulator 156 located downstream of the supply air source 108, and a three-way valve 157 located downstream of the pressure regulator 156. The supply air source 108, the pressure regulator 156, and the three-way valve 157 are connected by supply air tubing 159. Test air is supplied from the valve 157 through test air tubing 160 to the sealed chamber 20, via the test air connector 150 and the test air bore 146. The three-way valve 157 is preferably a Whitey Co. Model B-43XS4 three-way valve 157, which is available from Minnesota Valve & Fitting Co. of Minneapolis.

In one embodiment, the test pressure regulator 156 preferably includes a high pressure regulator (not shown) and a low pressure regulator (not shown) oriented in series. The high and low pressure regulators are preferably Norgren Model 11-018 pressure regulators available from C. A. Norgren Co. of Littleton, Colo.

Figure 10:
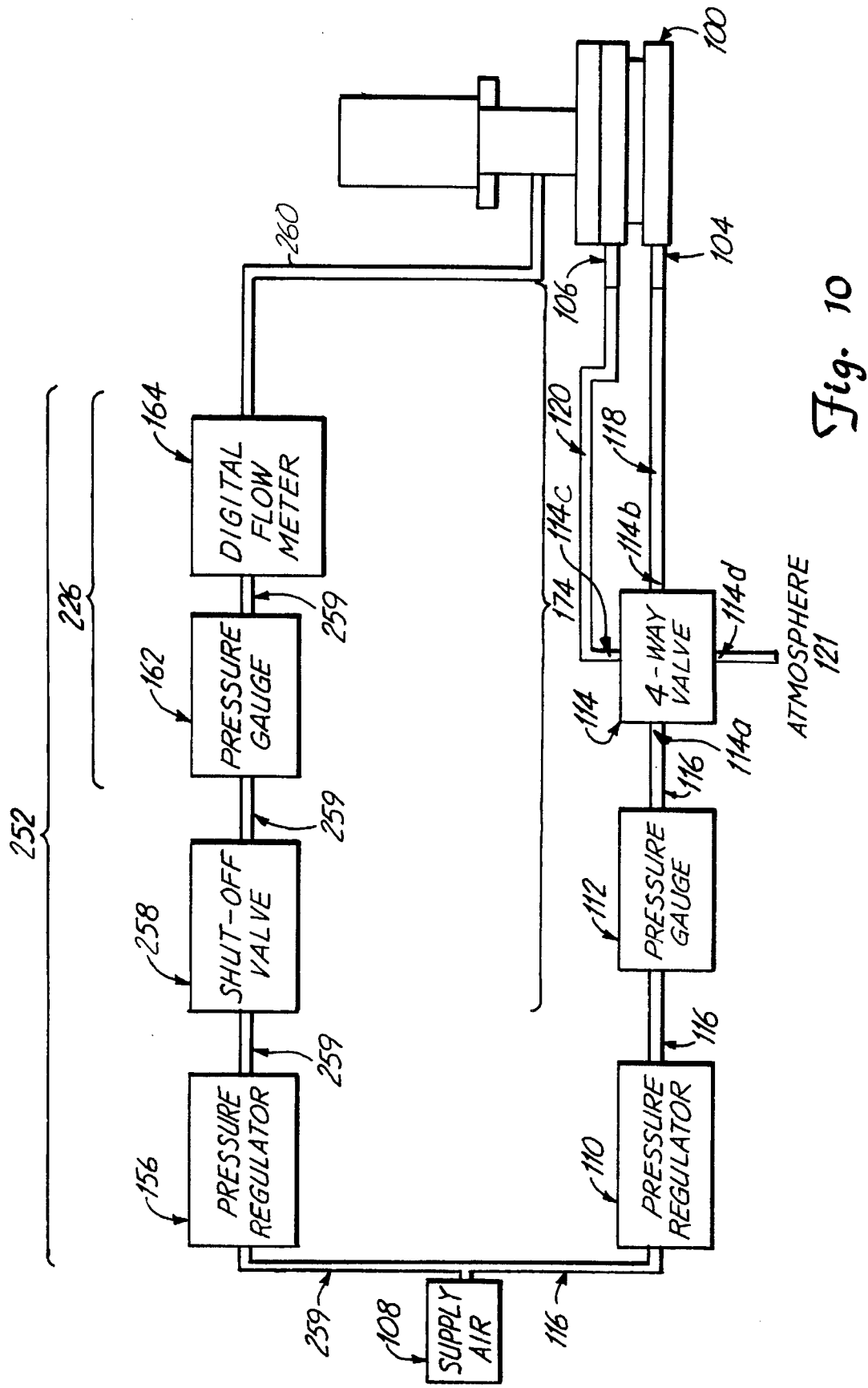
FIG. 10 is a schematic view of seal actuation components in another embodiment of the improved can testing device.

In another embodiment illustrated in FIG. 10, a test air supply circuit 252 includes the supply air source 108, the pressure regulator 156 (or the high and low pressure regulators) located downstream of the supply air source 108, and a shut-off valve 258 located downstream of the pressure regulator 156 (or downstream of the high and low pressure regulators). The supply air source 108, the regulator 156 (or the high and low pressure regulators) and the valve 258 are connected by supply air tubing 259. Test air is supplied from the shut-off valve 258 through supply air tubing 259 and test air tubing 260 to the sealed chamber 20, via the test air connector 150 and the test air bore 146. The shut-off valve 258 is preferably an Automatic Switch Company (ASCO) Red-Hat® Model 8262G2 solenoid valve, which is available from Lakeland Engineering Equipment Co. of Golden Valley, Minn.

The mechanism 26 for measuring leakage from the can 12, also illustrated in FIG. 8, includes a pressure gauge 162 located downstream of the pressure regulator 156 (or downstream of the high and low pressure regulators) and a digital flowmeter 164 located downstream of the pressure gauge 162 and upstream of the three-way valve 157. The pressure gauge 162 and the digital flowmeter 164 are connected to the supply air tubing 159 between the pressure regulator 156 and the three-way valve 157 (or between the high and low pressure regulators and the three-way valve 157). The digital flowmeter 164 is preferably an Aalborg Model GFM-1700 digital flowmeter, which is available from Aalborg Instruments & Controls, Inc. of Monsey, N.Y.

In the embodiment illustrated in FIG. 10, the device 10 includes a mechanism 226 for measuring leakage from the can 12. The mechanism 226 includes the pressure gauge 162 which is located downstream of the shut-off valve 258 and the digital flowmeter 164 which is located downstream of the pressure gauge 162. The pressure gauge 162 and the digital flowmeter 164 are connected by the supply air tubing 259.

Figure 6:
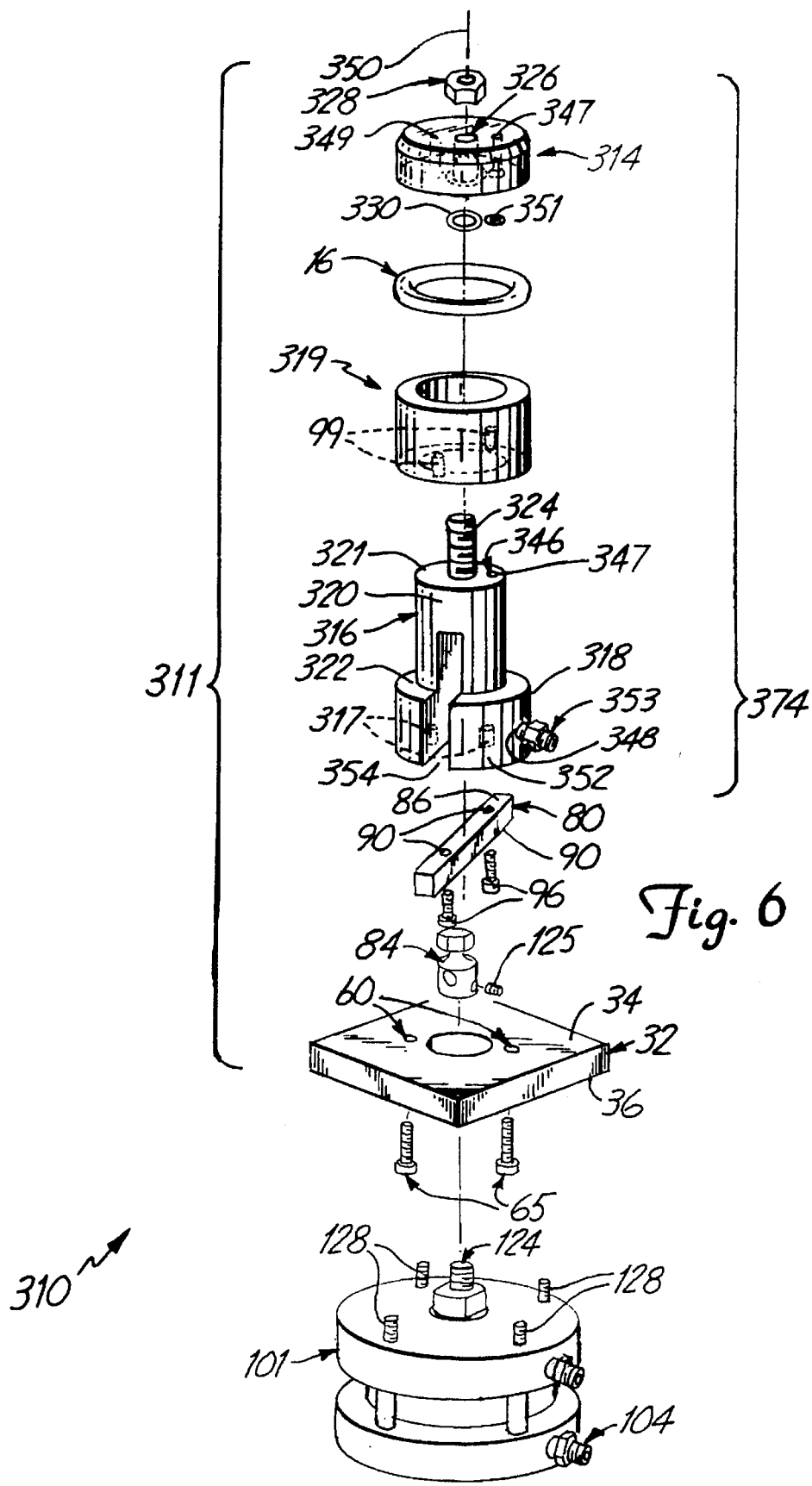
FIG. 6 is an exploded perspective view of another embodiment of the improved can testing device.

In another embodiment of the present invention, as illustrated in FIG. 6, a can testing device 310 includes a main body 311. The main body 311 of FIG. 6 differs from the main body 11 of FIG. 3 in that the main body 311 includes a cap 314, a sleeve-receiving member 316 which is separable from the cap 314, and a support member 318. In one embodiment, the members 316, 318 are cylindrical in shape and the cap 314 takes the form of a circular plate. The support member 318 is integral with the sleeve-receiving member 316 and includes threaded bores 317 which are aligned with the clearance holes 60 of the base 32. The support member 318 includes a radial ledge 322 which is defined by the intersection of the sleeve-receiving member 316 and the support member 318.

The support member 318 is fixedly attached to the top side 34 of the base 32 by the screws 65 which extend through the clearance holes 60 and into the threaded bores 317 such that the support member 318 is located between the base 32 and the sleeve-receiving member 316. A rectangular chamber 354, substantially similar to the rectangular chamber 54 of the embodiment illustrated in FIG. 3, extends fully through the support member 318 and ends approximately halfway along the sleeve-receiving member 316.

The can testing device 310 includes a single piece sleeve member 319 which is substantially similar to the single piece sleeve member 219 of the embodiment of FIG. 5. The sleeve member 319 slidably engages an outer peripheral surface 320 of the sleeve-receiving member 316. The single piece sleeve member 319 is preferably made of aluminum.

The sleeve-receiving member 316 and the cap 314, respectively, include a threaded shaft 324 and a smooth bore 326. The smooth bore 326 extends between and through both major surfaces (not shown) of the cap 314. The threaded shaft 324 and the smooth bore 326 are in alignment and extend along a longitudinal axis 350 of the sleeve-receiving member 316. The threaded shaft 324 extends through the smooth bore 326, and a nut 328 is threaded onto the shaft 324 to secure the cap 314 to a top side 321 of the sleeve-receiving member 316. An O-ring seal 330 is positioned about the shaft 324 between the sleeve-receiving member 316 and the cap 314.

In the embodiment of FIG. 6, the mechanism 17 for effecting an increase of pressure in the sealed chamber of the can 12 includes a test air bore 346 in the main body 311 which is substantially similar to the test air bore 46 of the embodiment of FIG. 3. The test air bore 346 includes a substantially vertical component 347 and a substantially horizontal component 348.

The vertical component 347 begins at a top side 349 of the cap 314 and extends through the cap 314 and the sleeve-receiving member 316 toward the base 32 to a point (not shown) in the right leg portion 58 below the radial ledge 322 and above the threaded bores 317. The vertical component 347 is threaded proximate the top side 349 of the cap 314 such that a bolt (not shown) with an O-ring seal (not shown) is threadably engageable with the vertical component for testing purposes, such as for determining the integrity of a test system space 374. The test system space 374 is defined as that volume located between a test air supply circuit shut-off valve (not shown) and the top side 349 of the cap 314, as illustrated in FIG. 6. Additionally, an O-ring seal 351 is positioned in alignment with the vertical component 347, where the vertical component 347 passes from the cap 314 into the sleeve-receiving member 316, to prevent leakage from the vertical component 347.

The horizontal component 348 of the test air bore 346 is located in the right leg portion 58 and extends outward from the vertical component 347, proximate the rectangular chamber 354, through an outer peripheral surface 352 of the support member 318. A test air connector 353 is connected, preferably by threads, to the horizontal component 348 proximate the outer peripheral surface 352. The diameter of the support member 318 is preferably large enough to allow threaded connection of the test air connector 353 into the horizontal component 148.

Figure 7:
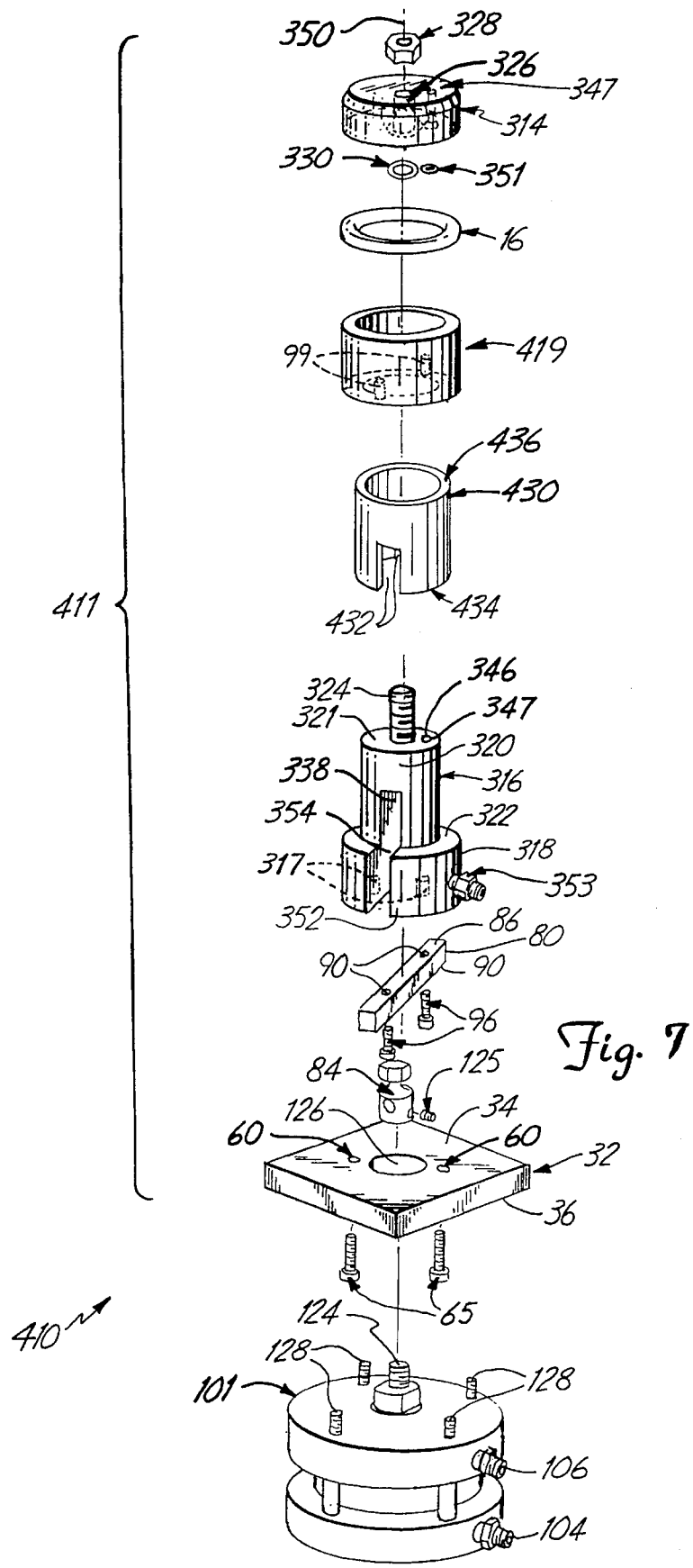
FIG. 7 is an exploded perspective view of another embodiment of the improved can testing device.

In another embodiment of the present invention, as illustrated in FIG. 7, a can testing device 410 includes a main body 411. The main body 411 of FIG. 7 differs from the main body 311 of FIG. 6 in that the main body 411 includes a slotted sleeve 430 which engages the outer peripheral surface 320 of the sleeve-receiving member 316. The inner diameter of the slotted sleeve 430 is less than the diameter of the support member 318 such that the radial ledge 322 limits downward movement of the sleeve 430.

The slotted sleeve 430 includes opposing rectangular slots 432 which start at a bottom end 434 of the sleeve 430 and extend approximately halfway toward a top end 436 of the sleeve 430. The rectangular slots 432 are oriented in the sleeve 430 such that the slots 432 are in substantial alignment with the rectangular chamber 354. Also, the rectangular slots 432 are substantially co-extensive with openings 338 created by the chamber 354 in the surface 320 of sleeve-receiving member 316.

A single-piece sleeve member 419, which is otherwise similar to the sleeve member 319 of the FIG. 6 embodiment, slidably engages the slotted sleeve 430. All other details about the embodiment of FIG. 7 are similar to those previously described for the embodiment illustrated in FIG. 6.

With the cap 314 being separable from the sleeve-receiving member 316, the testing device 410 of FIG. 7 readily accommodates a continuous, wider range of can 12 diameters, compared to existing can testing apparatuses. This ability to accommodate different diameter cans 12 further extends the inherent flexibility of the present invention. To accept cans 12 with a different diameter, the cap 314, the slotted sleeve 430, the sleeve member 419, and the seal ring 16 are interchangeable with different size caps 314, slotted sleeves 430, sleeve members 419, and seal rings 16 to fit the cans 12 with different diameters onto the device 410.

Figure 11:
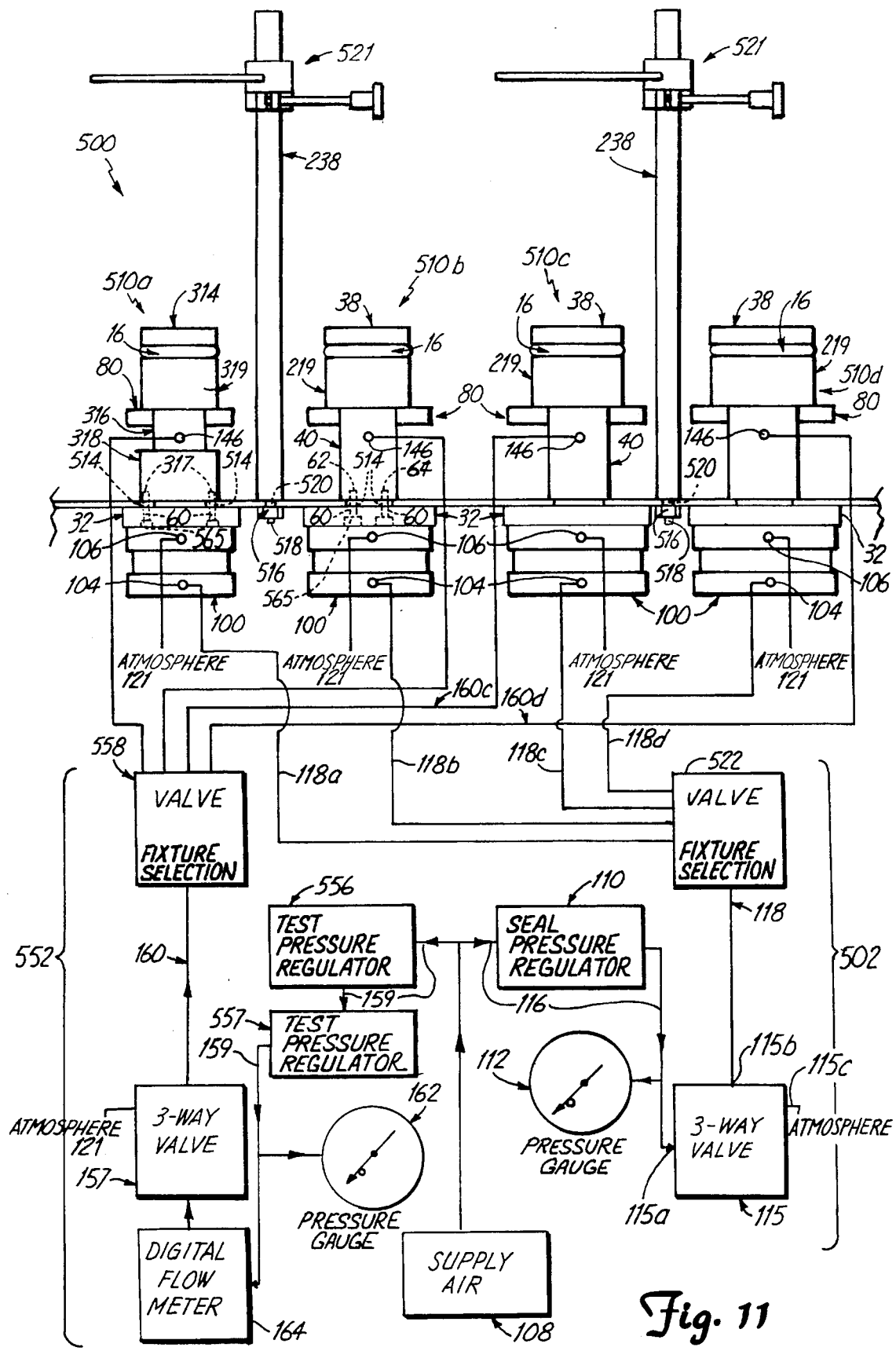
FIG. 11 is a schematic view of one embodiment of the can testing system of the present invention.

In another embodiment of the present invention, as illustrated in FIG. 11, a can testing system 500 includes first, second, third, and fourth can testing devices 510a, 510b, 510c, 510d, a drive air circuit 502, and a test air circuit 552. Each device 510a–510d of the system 500 is selectively connected to the drive air circuit 502 and to the test air circuit 552.

In one embodiment, the first can testing device 510a is substantially similar to the can testing device 310 of the embodiment of FIG. 6 and the second, third and fourth can testing devices 510b, 510c, and 510d are substantially similar to the can testing device 210 of FIG. 5. In one embodiment, each of the devices 510a–510d is preferably sized to accept a different diameter can 12. Specifically, in one embodiment, the devices 510a–510d are sized to accept the following can sizes and have respective caps 314, 38 with the following diameters:

| DEVICE | CAN SIZE | DIAMETER OF CAP 314 |
| --- | --- | --- |
| 510a | 112 | 1.740 inches |

| DEVICE | CAN SIZE | DIAMETER OF CAP 38 |
| --- | --- | --- |
| 510b | 200 | 1.970 inches |
| 510c | 204 | 2.240 inches |
| 510d | 214 | 2.880 inches |

In one embodiment, the seal rings 16 of the devices 510a–10d preferably have a 40 durometer rating. In another embodiment, the seal rings 16 of the devices 510a–510d preferably are made in accordance with the following ASTM standards and are made of the following compounds:

| DEVICE | ASTM STANDARD | COMPOUND |
| --- | --- | --- |
| 510a | 1–323 | 4523 |
| 510b | 250–1.438 | 5606 |
| 510c | 1–402 | 19411 |
| 510d | 1–408 | 7503 |

Seal rings 16 meeting these standards and specifications are available from Precision Associates, Inc., of Minneapolis, Minn.

The devices 510a–510d are mounted on a support panel 512. For purposes of illustration, only details about the panel 512 mounting for the first device 510a and the second device 510b are discussed. The panel 512 mounting details are substantially the same for the third and fourth devices 510c, 510d as for the second device 510b. The panel 512 includes a plurality of pairs of smooth bores 514 and a plurality of pairs of screws 565. One pair of the bores 514 is aligned with the clearance holes 60 of the base 32 and the threaded bores 317 of the support member 318. For each of the devices 510b–501d, the other pairs of the bores 514 are aligned, respectively, with the clearance holes 60 of the base 32 and the threaded bores 62, 64 of the sleeve-receiving members 40.

The first device 510a is mounted such that the panel 512 is located between the support member 318 and the base 32. The screws 565 extend through the clearance holes 60, through the smooth bores 514 and into the threaded bores 317 to secure the support member 318 and the base 32 to the panel 512. The second device 510b is mounted such that the panel 512 is located between the sleeve-receiving member 40 and the base 32. The screws 565 extend through the clearance holes 60, through the smooth bores 514 and into the threaded bores 62, 64 to secure the sleeve-receiving member 40 and the base 32 to the panel 512.

The devices 510b–510d include the drive cylinder 100 of the embodiment of FIG. 5 rather than the drive cylinder 101 of the embodiment of FIG. 6, although it is to be understood that drive cylinder 100 is interchangeable. Further, it is understood that the devices are set up as described in FIG. 9 regardless of cylinder type or style. Additionally, the system 500 includes a pair of mechanisms 521 for positioning and securing the cans 12. The mechanisms 521 are substantially similar to the mechanisms 221 of the embodiment of FIG. 2, except that the mechanisms 521 are attached to the panel 512, rather than to the base 32. One of the mechanisms 521 is fixedly attached to the panel 512 between the first and second devices 510a, 510b, and the other mechanism 521 is fixedly attached to the panel 512 between the third and fourth devices 510c, 510d. The mechanisms 521 each include a threaded shaft 518 which extends through a respective smooth bore 520 of the panel 512. A nut 516 is attached to each of the threaded shafts 518 to secure the mechanisms 521 to the panel 512.

The drive air circuit 502 is substantially similar to that of the embodiment illustrated in FIG. 9. The pressure regulator 110 is preferably a Linde Model 1-SG4820-100 pressure regulator available from Union Carbide Corporation (Linde Division) of Somerset, N.J. The drive air circuit 502 also includes a five-way fixture selection valve 522 for selecting the device 510a, 510b, 510c, or 510d to be actuated. The fixture selection valve 522 is located between the three-way valve 115 and the actuation air ports 104 of the devices 510a–510d. The fixture selection valve 522 is connected to the actuation air ports 104 of the devices 510a–510d by actuation tubing 118a, 118b, 118c, 118d, respectively. The five-way fixture selection valve 522 is preferably a Whitey Co. Model B-43ZF2 five-way valve, which is available from Minnesota Valve & Fitting Co. of Minneapolis.

The test air circuit 552 is substantially similar to the test air supply circuit 152 of the embodiment of FIG. 8. However, the test air circuit 552 includes high and low test pressure regulators 556, 557. The pressure regulators 556, 557 are connected in series, with the regulator 556 upstream of the regulator 557, between the supply air source 108 and the digital flow meter 164. The high and low test pressure regulators 556, 557 are preferably Norgren Model 11-018 pressure regulators available from C. A. Norgren Co. of Littleton, Colo. The test air circuit 552 also includes a five-way fixture selection valve 558 for selecting the device 510a, 510b, 510c, or 510d to be tested. The fixture selection valve 558 is located between the three-way valve 157 and the test air bores 146 of the devices 510a–510d. The fixture selection valve 558 is connected to the test air bores 146 of the devices 510a–510d by test air tubing 160a, 160b, 160c, 160d, respectively.

The method of testing the can 12 begins with the step of assuring that a test system space 174 is vented, referring to FIG. 8 for illustration. The test system space 174 is defined as that volume of the test air supply circuit 152 or 252 located between the three-way valve 157 and the top side 44 of the cap 38, as illustrated in FIG. 3. For the illustrated embodiments, the test system space 174 is vented when the three-way valve 157 is positioned to vent the test air tubing 160 of test air supply circuit 152 or the test air tubing 260 of test air supply circuit 252, respectively, to atmosphere 121.

The method of testing the can 12, using the embodiment of FIG. 3 for purposes of illustration, then involves positioning the can 12 on the main body 11 of the can testing device 10. The can 12 is placed onto the cap 38 and the sleeve member 19 such that the interior surface 14 of the can 12 slidably engages an outer peripheral surface 23 of the sleeve member 19 and the outer peripheral surface 70 of the cap 38. Though the interior surface 14 of the can 12 and the surfaces 23, 70 of the testing device 10 are in slidable contact, the surface 14 and the surfaces 23, 70 are not in sufficient contact to elevate pressure within the can 12 as the can 12 is placed on the cap 38 and the sleeve member 19.

In one embodiment of the method of testing the can 12, a lightweight oil, such as a silicone-based oil or a soy oil, is applied to a spiral joint (not shown) of the can 12 to enhance the seal formed by the seal ring 16 proximate the spiral joint. In another embodiment of the method of testing the can 12, a cylindrical support sleeve (not shown) is placed around an outer surface (not shown) of the can 12, proximate the seal ring 16. The support sleeve permits application of increased seal pressure to the seal ring 16 with decreased risk of damaging the can 12. In one embodiment, the support sleeve (not shown) is integral with device 10. In another embodiment, the support sleeve (not shown) is not connected to the device 10.

Next, referring back to FIG. 1 for illustration, the mechanism 21 for positioning and securing the can 12 is placed to position and secure the can 12 for testing. First, the nuts 143 are set at a desired limiting position 137 above the closed end 142 of the can 12. Then, the bar 136 is positioned beneath and against the nuts 143 such that the shafts 140, 141 extend through the bore 138 and the slot 139, respectively. The nuts 144 are then secured against the bar 136 such that the bar 136 is located between the nuts 143 and the nuts 144. The can 12 is then moved upward such that the closed end 142 of the can 12 contacts the bar 136. Alternatively the mechanism 221 of FIG. 2 may be used in the method in place of the mechanism 21 of FIG. 1.

Next, the mechanism 13 for sealing against an internal surface of the can and the mechanism 15 for placing the mechanism 13 for sealing in a sealing relationship with the internal surface of the can are activated to create the sealed chamber 20. In one embodiment illustrated in FIG. 3, this entails activating the mechanism 22 for moving the sleeve member 19 into operating relationship with the seal ring 16.

Figure 4:
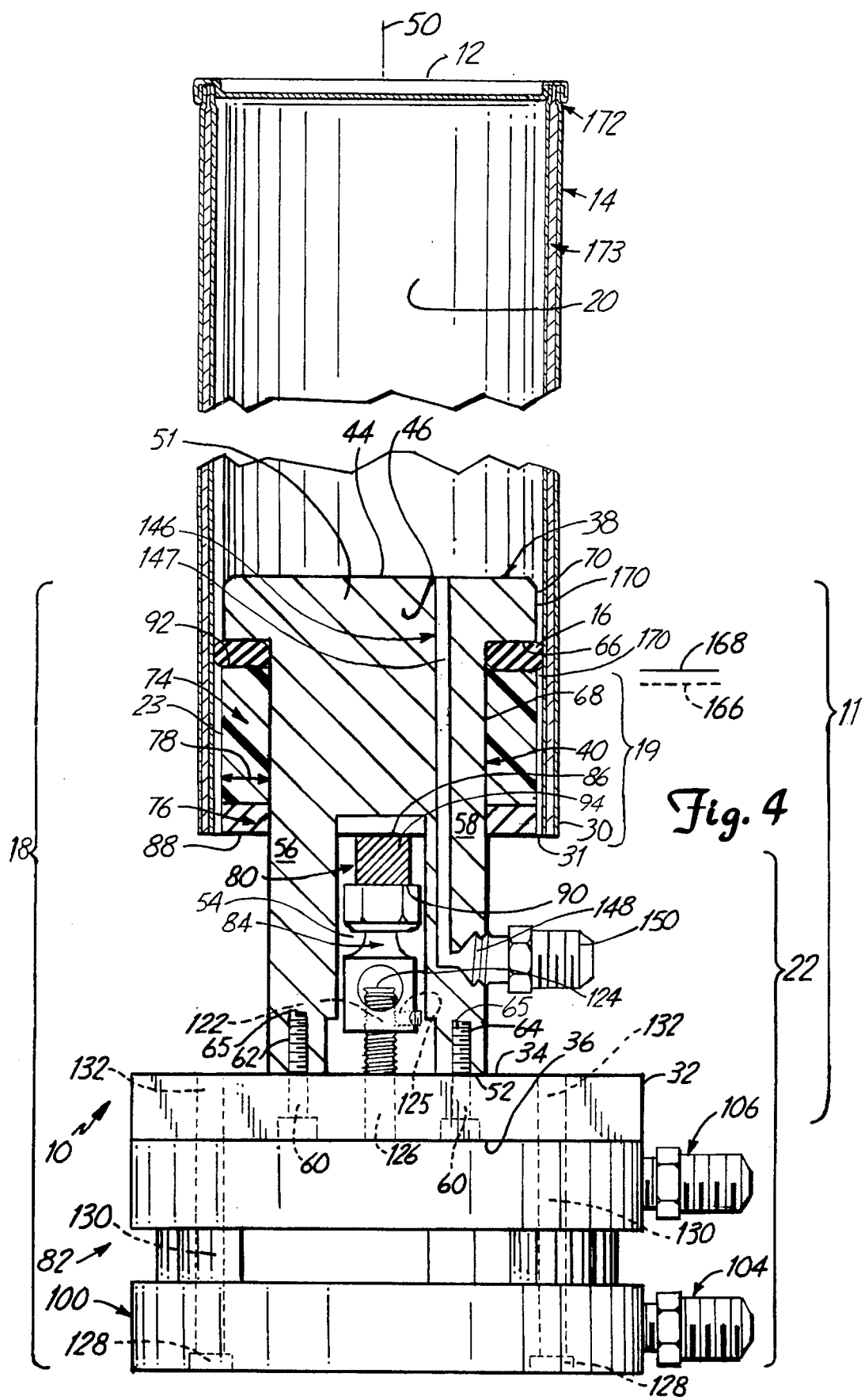
FIG. 4 is a sectional view taken along line 1—1 of FIG. 1, showing a seal ring in the sealing position.

First, using FIG. 8 for purposes of illustration, the drive air circuit 102 is actuated to move the sleeve member 19 from a rest position 166, as illustrated in FIG. 3, to a seal actuation position 168, as illustrated in FIG. 4. In the rest position 166, the sleeve member 19 exerts minimal compressive forces on the seal ring 16. Therefore the seal ring 16 does not extend beyond the outer peripheral surface 70 of the cap 38. In the seal actuation position 168, however, the ring end 92 of the sleeve member 19 is forced toward the radial ledge 66 such that the seal ring 16 is compressed and squeezed out into a gap 170 between the interior surface 14 of the can 12 and the main body 11 of the testing device 10.

The gap 170 is exaggerated in size for purposes of illustration. The gap 170, in FIG. 3, is substantially nonexistent, except proximate the seal ring 16 between the sleeve member 19 and the cap 38. The gap 170, in FIG. 4, is sealed by the seal ring 16, though the gap 170 does remain immediately above and below the seal ring 16.

The chamber 20 is sealed when the seal ring 16 fully spans the gap 170. The sealed chamber 20 is defined by the can 12, the seal ring 16 in the actuation position 168, and the main body 11. The can 12 to be tested includes a vent feature 172 for venting the sealed chamber 20. For the can 12 depicted in FIG. 3, the vent feature 172 is formed where the closed end 142 of the can 12 and a wall 173 of the can 12 are joined.

The drive air circuit 102 of FIG. 8 is activated by positioning the four-way valve 114 to direct pressurized air flow from the supply air source 108 into the supply air port 114*a* via the supply air tubing 116, then out the actuation port 114*b* and into the actuation port 104 of the cylinder 100 via the actuation tubing 118. Referring back to FIG. 3, the pressure thus supplied drives a piston (not shown) of the drive cylinder 100 toward the cap 38 such that the threaded shaft 124, the swiveling connector 84 and the drive block 80 cooperate to move the sleeve member 19 from the rest position 166 to the seal actuation position 168.

In the embodiment of FIG. 9, the cylinder 101 is actuated to move the seal ring 16 to the actuation position 168 by positioning the three-way valve 115 to direct pressurized air flow from the supply air source 108 into the supply air port 115*a* via the supply air tubing 116, then out the actuation port 115*b* and into the actuation port 104 of the cylinder 100 via the actuation tubing 118. For the drive air circuit 502 of FIG. 11, the five-way fixture selection valve 522 is additionally positioned to direct pressurized air flow to the actuation air port 104 of the desired testing device 510*a*, 510*b*, 510*c*, 510*d*.

The pressure selected to drive the piston (not shown) of the drive cylinder 100 depends upon several variables, including the seal ring 16 durometer rating, the seal ring 16 diameter, the gap 170 size, the extent to which the shaft 124 is threaded into the bore 122 of the swiveling connection 84, and the stroke length of the drive cylinder 100. Typically, pressures ranging from approximately 40 pounds per square inch gauge (psig) to approximately 80 psig are required. The pressure required to move the sleeve member 19 and compress the seal ring 16 increases as the durometer rating of the seal ring 16 increases since higher durometer ratings equate to increased seal ring 16 stiffness.

The next steps of testing the can 12 include increasing pressure in the can 12 using the mechanism 17 for effecting an increase of pressure in the sealed chamber 20 and determining the leakage rate from the can 12 using the mechanism 26 for measuring leakage from the can 12. Multiple embodiments of the inventive method for monitoring the leakage rate from the can 12 are contemplated. A preferred embodiment, subsequently referred to as the "direct measurement" embodiment, is described later.

One embodiment of the method for monitoring the leakage rate, subsequently referred to as the "pressure drop" embodiment, includes determining the rate of pressure drop from the sealed chamber 20 and from the test system space 174. The "pressure drop" embodiment generally requires that a mechanism (not shown) for determining pressure drop be included within the volume from which the pressure drop will occur, preferably the test system space 174, to measure the amount of pressure drop within the volume. The FIG. 10 embodiment includes the pressure gauge 162 as the mechanism (not shown) for determining pressure drop.

In the "pressure drop" embodiment, referring to FIG. 10 for purposes of illustration, the supply air source 108 is first activated to pressurize the test air supply circuit 252. The three-way valve 157 is then positioned such that air from the supply air source 108 will flow through the tubing 259, 260 through the test air bore 146, as depicted in FIG. 3, and into the sealed chamber 20 of the can 12. It is understood that other valves, such as a four-way valve may be used in the conveyance of supply air. Next, the test pressure regulator 156 is set to the desired test pressure for the sealed chamber 20. Typical test pressures within the sealed chamber 20 range up to approximately 5 psig, although higher pressures are contemplated.

Alternatively, if the high and low test pressure regulators are used in place of the regulator 156 (not shown), the low test pressure regulator is set to the desired pressure, and the high test pressure regulator is set to a pressure higher than the desired test pressure such that excessive cycling of the low test pressure regulator does not occur. Additionally, in the embodiment of FIG. 10, which includes the flow meter 164, proper setting of the high test pressure regulator to minimize cycling will result in a relatively steady flow reading from the meter 164.

In the "pressure drop" embodiment of the method employing the system 500 of FIG. 11, the fixture selection valve 558 is additionally positioned to direct flow to the test air bore 146 of the desired testing device 510*a*, 510*b*, 510*c*, 510*d*. Also for the test air circuit 552, the high and low test pressure regulators 556, 557 are set. The low test pressure regulator 556 is set at the desired test pressure. The high test pressure regulator 557 is set at a pressure somewhat higher than the desired test pressure such that the low pressure regulator does not cycle excessively and the flow meter 164 attains a relatively steady flow reading. Furthermore, to practice the "pressure drop" embodiment of the method with the embodiment of FIG. 11, a shut-off valve (not shown) is necessary between the supply air source 108 and the pressure regulator 557 to allow for pressure drop measurement.

Referring back to FIG. 4, air at the regulated pressure flushes the sealed chamber 20 for up to several minutes before the shut-off valve 258 of FIG. 10 is positioned to stop test air flow into the sealed chamber 20. The pressure gauge 162 is read at the same time the valve 258 is shut off. The pressure gauge 162 is read again exactly 60 seconds after the valve 258 is shut off to determine the pressure drop from the sealed chamber 20 and the test system space 174. Alternatively, the pressure drop is determined using the embodiment of FIG. 11, including the shut-off valve (not shown).

After determining the rate of pressure drop (pressure drop per minute) from the sealed chamber 20 and the test system space 174, a volumetric leakage rate is calculated using an equation which depends upon several variables, including the volume of the sealed chamber 20, the volume of the test system space 174, and the rate of pressure drop.

The "pressure drop" embodiment of the method of determining the leakage rate eliminates some of the problems of existing leakage rate determination methods. Nonetheless, the volumetric leak rate equation employed still depends upon the volume in which the pressure drop occurred.

Therefore it is necessary to accurately determine and control the volume of not only the sealed chamber 20, but also of the test system space 174.

The "pressure drop" embodiment of the method for determining the leakage rate also reduces inherent benefits available from the improved testing device 10, since the volume of the sealed chamber 20 changes each time the can 12 tested has a different dimension, such as length or diameter. Thus, the volume of the sealed chamber 20 must be redetermined whenever the volume of the sealed chamber 20 varies or, alternatively, the length of the can 12 must be cut to maintain the sealed chamber 20 at a constant volume.

The "pressure drop" embodiment of the method also requires accurate measurement of a small change in pressure over a known time period. Overall, the "pressure drop" embodiment of the method, with measurement of multiple variables, includes multiple sources of error. Though the "pressure drop" embodiment of the method works in practice, the embodiment is relatively time consuming and requires careful control of multiple test variables.

The preferred "direct measurement" embodiment of the method for determining leakage from the can 12, includes the digital flowmeter 164, as illustrated in FIG. 8. To practice the method, the supply air source 108 is activated, and the three-way valve 157 is positioned to initiate pressurized air flow from the supply air source 108 through the digital flowmeter 164, through the test air bore 146, and through the sealed chamber 20. Also, the pressure regulator 156 is set to the desired test pressure. Alternatively, for those embodiments substituting the high and low test pressure regulators (not shown) for the pressure regulator 156, the high and low test pressure regulators are set as previously detailed. The rate of leakage from the sealed chamber 20 is read directly from the digital flowmeter 164 in units of volume of leakage per period of time.

·For the test air circuit 552 of FIG. 11, the four-way valve 558 is additionally positioned to the test air bore 146 of the desired testing device 510a, 510b, 510c, 510d. Also for the test air circuit 552, the high and low test pressure regulators 556, 557 are set. The low test pressure regulator 557 is set at the desired test pressure and the high test pressure regulator 556 is set such that the regulator 556 does not cycle excessively and such that the flow rate the flow meter 164 indicates is relatively steady.

Direct measurement of the rate of leakage from the can 12, using the described embodiments, does not depend upon the volume of the sealed chamber 20 or upon the volume of the test system space 174. The accuracy of the "direct measurement" embodiment depends upon relatively few variables, including the accuracy of the digital flowmeter 164, the volumetric rate of leakage from the test system space 174, and the effectiveness of the seal ring 16 in sealing the chamber 20.

Digital flowmeter accuracy is well known in the art. Furthermore, proof that the test system space 174 is either free of leaks or instead includes a steady repeating rate of leakage is easily obtained using the present invention.

First, referring back to FIG. 3, a threaded plug (not shown) is inserted in the vertical component 147 of the test air bore 146 proximate the top side 44 of the cap 38. Regulated pressure is then supplied to the test system space 174 using the test air supply circuit 152, illustrated in FIG. 8, to determine if flow leakage from the test system space 174 occurs. The rate of flow from the test system space 174 is measured directly from the digital flowmeter 164. If leakage from the test system space 174 is measured, the leak is either repaired or, if the leakage rate is steady, the leakage rate is used as a correction factor for measuring the rate of leakage from the sealed chamber 20 using the digital flowmeter 164.

Using a sealed test can (not shown) which does not leak in place of the can 12 of FIG. 3, it is also possible to test the effectiveness of the seal ring 16 when the sleeve member 19 is in the seal actuation position 168. As previously described with reference to the can 12, the sealed test can (not shown) is positioned on the device 10, the seal ring 16 is moved into the actuation position 168, and then the pressure within the sealed test can is increased. If the digital flowmeter 164 of FIG. 8 registers no flow rate with the sealed test can pressurized, the seal ring 16 is working correctly and will not compromise accurate leak flow rate measurement. If the digital flowmeter 164 does register a flow rate, repair or replacement of the seal ring 16 or other components of the device 10 is necessary before accurate leak flow rate measurement is available.

On completion of can 12 leak testing, shut down of the can testing device 10 requires only a few simple steps. First, referring to the embodiment of FIG. 8, the three-way valve 157 is positioned to vent the test system space 174 and the sealed chamber 20 to atmosphere 121. In this position, the three-way valve 157 also blocks the supply air tubing 159 such that the flow of pressurized air to the test system space 174 and the sealed chamber 20 from the supply air source 108 is stopped.

The four-way valve 114 is then positioned to direct pressurized air flow from the supply air source 108 into the supply air port 114a via the supply air tubing 116, then out the deactuation port 114c and into the deactuation port 106 of the cylinder 100 with the deactuation tubing 120. The pressurized air then exits the actuation port 106 and vents to atmosphere 121 through the vent port 114d of the four-way valve 114.

Referring back to the embodiment of FIG. 3, the flow of pressurized air into the deactuation port 106 forces the piston (not shown) of the drive cylinder 100 downward such that the piston (not shown) and the swiveling connector 84 pull the drive block 80 and the attached sleeve member 19 from the seal actuation position 168 to the rest position 166. The seal ring 16 simultaneously moves away from the interior surface 14 of the can 12 and reopens the gap 170 proximate the ring 16.

In another embodiment, referring to FIG. 9, the supply air source 108 is shut off, and the three-way valve 157 is positioned to vent the device 10 as described for the embodiment of FIG. 8. The three-way valve 115 is then set to the vent port 115c to vent the actuation port 104 and the actuation tubing 118 to atmosphere 121. In this position, the flow of pressurized air into the supply air port 115a of the three-way valve 115 is blocked. The spring return (not shown) of the cylinder 101 thereafter returns the sleeve 19 to the rest position 166 from the seal actuation position 168. The seal ring 16 may also return the sleeve 19 to the rest position 166 singularly or in combination with the spring return.

In another embodiment, referring to FIG. 11, with the valves 558, 522 positioned to the selected testing device 510a, 510b, 510c, or 510d, the three-way valve 157 is first positioned to vent the device 10 as described for the embodiment of FIG. 8. Then, the three-way valve 115 is positioned to vent the cylinder 101 as described for the embodiment of FIG. 9.

The final step of testing the can 12, referring to the embodiment of FIG. 1 for illustration, includes rotating the positioning bar 136 about the shaft 140 such that the bar 136 is clear of the can 12. The can is then lifted off the main body 11. The can testing device 10 is now available for additional can 12 testing. If using the embodiment of FIG. 2, the positioning bar 236 is then rotated about the support post 238 such that the bar 236 is clear of the can 12. If using the embodiment of FIG. 11, the mechanism 521 is operated as per the description for the mechanism of FIG. 2 prior to removing the can 12.

Although the present invention has been described with reference to preferred embodiments, workers skilled in the art will recognize that changes may be made in form and detail without departing from the spirit and scope of the invention.

What is claimed is:

1. A device for testing cans of any height for leakage and for leakage rates using direct measurements, the device comprising:

a main body for receiving a can, the main body having a single test fluid bore in fluid communication with an internal volume of the can;

means for sealing against an internal surface of the can to effect a sealed chamber between the can and the main body, comprising a deformable seal ring mounted on the main body, wherein the deformable seal ring rests on a sleeve member;

means for moving the sleeve member into an operating relationship with the seal ring to effect the sealed chamber between the can and the main body, comprising a drive block which engages the sleeve member;

means for effecting an increase of pressure in the sealed chamber through the test bore; and means for measuring volumetric fluid flow rates needed for sustaining the increase of pressure within the can to directly measure the leakage and leakage rate of the can.

2. The device of claim 1 wherein the means for moving the sleeve member into an operating relationship with the seal ring comprises means for moving the seal ring into a sealing relationship with the internal surface of the can to effect the sealed chamber between the can and the main body.

3. The device of claim 2 wherein the main body includes a base, a cap portion with a first peripheral dimension, and a sleeve portion with a second peripheral dimension, with the sleeve portion being located between the cap portion and the base and with the first peripheral dimension being substantially equal to the second peripheral dimension.

4. The device of claim 3 wherein the seal ring is oriented on the sleeve portion adjacent the cap portion.

5. The device of claim 4 wherein the means for moving the seal ring into a sealing relationship with the internal surface of the can further comprises means for moving at least part of the sleeve portion relative to the base.

6. The device of claim 1 and further comprising means for positioning and securing the can proximate the seal ring.

7. A system for testing cans for leakage, the system, comprising:

a plurality of testers, at least one of the testers comprising:
a main body for receiving the can, the main body having a single test fluid bore in fluid communication with an internal volume of the can;

means for sealing against an internal surface of one of the cans to effect a sealed chamber within the one can;

means for placing the means for sealing in a sealing relationship with the internal surface of the one can to effect the sealed chamber within the one can;

means for effecting an increase of pressure in the sealed chamber for determining leakage from the one can;

means for isolating and selectively actuating the means for placing the means for sealing in a sealing relationship with at least one tester;

means for isolating and selectively actuating the means for effecting an increase of pressure of at least one tester; and means for measuring volumetric flow rates needed for sustaining the increase of pressure within the can to directly measure the leakage and leakage rate of the can.

8. The system of claim 7 wherein the main body of at least one tester includes a base, a cap portion with a first peripheral dimension, and a sleeve portion with a second peripheral dimension, with the sleeve portion being located between the cap portion and the base and with the first peripheral dimension being substantially equal to the second peripheral dimension.

9. The system of claim 8 wherein the seal ring of at least one tester is oriented on the sleeve portion adjacent the cap portion.

10. The system of claim 7, with at least one tester further comprising means for measuring leakage variables.

11. The system of claim 10 wherein the means for measuring leakage variables, for at least one tester, comprises a flowmeter operatively connected to the means for effecting an increase of pressure in the sealed chamber.

12. A device for testing cans of different heights for leakage and for leakage rates using direct measurements, the device comprising:

a main body for receiving any one of the cans of different height, the main body having a base, a portion with a first peripheral dimension, a single test fluid bore in fluid communication with an internal volume of the can, and a sleeve portion with a second peripheral dimension, with the sleeve portion being located between the portion with the first peripheral dimension and the base and with the first peripheral dimension being substantially equal to the second peripheral dimension;

a deformable seal ring movably mounted on the main body and resting on the sleeve portion wherein the sleeve portion contacts the deformable seal ring and movement of the sleeve portion deforms the deformable seal ring;

means for sealing against an internal surface of the can to effect a sealed chamber between the can and the main body, comprising: the deformable seal ring mounted on the main body, the sleeve portion movably mounted on the main body where the seal ring rests on the sleeve portion and means for moving the sleeve portion into an operating relationship with the seal ring to effect the sealed chamber between the can and the main body;

means for effecting an increase of pressure in the sealed chamber through the test bore; and means for measuring volumetric flow rates needed for sustaining the increase of pressure within the can to directly measure the leakage and leakage rate of the can.

13. The device of claim 12 wherein the seal ring is oriented on the sleeve portion adjacent the portion with the first peripheral dimension.

14. The device of claim 13 wherein the means for moving the seal ring into a sealing relationship with the internal surface of the can further comprises means for moving at least part of the sleeve portion relative to the base.

15. A device for testing cans of different heights for leakage and leakage rates using direct measurements, the device comprising:

a main body, for receiving any one of the cans, the main body having a single test fluid bore in fluid communication with an internal volume of the can;

means for sealing against an internal surface of the can to effect a sealed chamber between the can and the main body comprising: a deformable seal ring mounted on the main body; a sleeve member operatively connected to the main body wherein the deformable seal ring rests on the sleeve member;

means for driving the sleeve member to move the deformable seal ring to effect the sealed chamber between the can and the main body;

means for effecting an increase of pressure in the sealed chamber between the can and the main body; and means for measuring volumetric fluid flow rates needed for sustaining the increase of pressure within the can to directly measure the leakage and leakage rate of the can.

16. The device of claim 15 wherein the means for driving the sleeve member comprises a driver operatively connected to the sleeve member.

17. A device for testing cans of different heights for leakage and for leakage rates using direct measurements, the device comprising:

a main body for receiving any one of the cans, the main body having a single test fluid bore in fluid communication with an internal volume of the can;

means for sealing against an internal surface of the can to effect a sealed chamber between the can and the main body comprising: a deformable seal ring mounted on the main body, a sleeve member movably mounted on the main body wherein the seal ring rests on the sleeve member, and means for moving the sleeve member into an operating relationship with the seal ring to effect the sealed chamber between the can and the main body;

means for effecting an increase of pressure in the sealed chamber through the test bore; and means for measuring volumetric fluid flow rates needed for sustaining the increase of pressure within the can to directly measure the leakage and leakage rate of the can.

18. The device of claim 17 wherein the main body has a bore communicable with the sealed chamber and wherein pressurized fluid is introduced into the sealed chamber via the bore.

19. The device of claim 17 wherein the means for measuring volumetric fluid flow rates needed for sustaining the increase of pressure within the can comprises a flow meter.

20. The device of claim 19 wherein the flowmeter is operatively connected to the means for effecting an increase of pressure in the sealed chamber.

* * * * *

UNITED STATES PATENT AND TRADEMARK OFFICE
CERTIFICATE OF CORRECTION

PATENT NO. : 5,596,137
DATED : January 21, 1997
INVENTOR(S) : Michael R. Perry, et al.

It is certified that error appears in the above-indentified patent and that said Letters Patent is hereby corrected as shown below:

Col. 19, line 7, after the word "mechanism", insert the numeral --221--

Signed and Sealed this

Tenth Day of June, 1997

Attest:

BRUCE LEHMAN

Attesting Officer

Commissioner of Patents and Trademarks